United States Patent
Guzman et al.

(10) Patent No.: US 7,082,435 B1
(45) Date of Patent: Jul. 25, 2006

(54) METHOD AND MECHANISM FOR IMPLEMENTING AND ACCESSING VIRTUAL DATABASE TABLE STRUCTURES

(75) Inventors: Raymond Guzman, Amherst, NH (US); Goutam D. Kulkarni, Nashua, NH (US); Joydip Kundu, Nashua, NH (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 09/476,141

(22) Filed: Jan. 3, 2000

(51) Int. Cl.
*G06F 17/30* (2006.01)

(52) U.S. Cl. .................. 707/102; 707/9; 707/10; 707/103 R; 706/16; 709/9; 709/226

(58) Field of Classification Search .............. 707/1–4, 707/100–104.1, 10, 9; 706/16; 709/9, 226
See application file for complete search history.

(56) References Cited

U.S. PATENT DOCUMENTS

| 6,078,925 A * | 6/2000 | Anderson et al. ............... 707/2 |
| 6,253,203 B1 * | 6/2001 | O'Flaherty et al. ............ 707/10 |
| 6,275,824 B1 * | 8/2001 | O'Flaherty et al. ............ 707/10 |

* cited by examiner

*Primary Examiner*—Shahid Al Alam
(74) *Attorney, Agent, or Firm*—Bingham McCutchen LLP

(57) ABSTRACT

The present invention is directed to a method and mechanism for encoding multiple virtual tables into one or more source tables. An aspect of the invention is directed to the access of a virtual table virtual table without requiring separate entries for the virtual table in the meta-data of a database system. Another aspect of the invention is directed to a virtual table that has different column signatures than its underlying source table(s).

34 Claims, 11 Drawing Sheets

METHOD AND MECHANISM FOR IMPLEMENTING AND ACCESSING VIRTUAL DATABASE TABLE STRUCTURES

BACKGROUND OF THE INVENTION

1. Field of the Invention

The invention relates to computer systems, and more particularly to the access of data from a database system.

2. Background

A "table" is a basic unit of storage in a relational or object-relational database system. Each table comprises one or more rows and columns. Each column is typically associated with a column name and a column datatype. A row comprises a set of related column data, and normally corresponds to a single database record.

"Metadata" is information in a database system that describes and defines other data. Metadata information includes data that describes the structure and parameters of tables and data maintained in the system, such as the exact column configuration or column "signature" of database tables. In many database systems, metadata is maintained separately from its associated data and tables, and is collected into a central "data dictionary." Thus, the data dictionary normally contains the foundational data that sets forth the basic structures of storage entities in a database system. When creating a new database table, the schema definition of that new table must be entered in the data dictionary before it is recognized by the system. If the schema definition of a table is changed (e.g., a column is to be added or dropped from the table), the associated metadata for that table must be modified in the data dictionary before the schema change is recognized.

Because metadata in the system data dictionary is so foundational to the integrity of a database system, there are normally severe limitations upon the extent of access permitted to the data dictionary. In many database systems, while a normal user has read-access to the data dictionary, only an authorized database administrator ("DBA") is given sufficient system privileges to make modifications.

The drawback to these restrictions is that normal database users may need to make structural modifications to a database table in the course of their daily activities, which cannot be readily made if these users do not have sufficient system privileges. For example, it may be necessary to add columns to a database table to store data being accessed by a user. Since the typical user is not granted sufficient privileges to modify the data dictionary, the user must wait for a DBA to make the changes on his behalf. This adds additional levels of delays and resources to perform the task of adding a new column to the table. Yet, the solution cannot be to simply grant the user sufficient privileges to modify the data dictionary, since there is a tremendous risk that a normal user may make an error when modifying the system metadata, causing severe and unintended damage to the structural integrity of the system.

Another drawback is that in conventional database systems, each database table must have its definitional metadata registered in the data dictionary before it can be accessed by users. The metadata costs do not significantly change if the table is intended to hold only a small amount of data. Consider if a user wishes to create a number of database tables that each store a small amount of data. System costs must be expended to generate and store the metadata for each database table. Under these circumstances, a significant proportion of the overhead associated with the database tables is expended just for the metadata in the data dictionary. While the relative metadata costs may be acceptable for a small number of tables containing a large amount of data, the relative costs may be inordinately high for a large number of tables designed to each hold only a small quantity of data.

SUMMARY OF THE INVENTION

The present invention is directed to a method and mechanism for encoding multiple virtual tables into one or more source tables. An aspect of the invention is directed to the access of a virtual table without requiring separate entries for the virtual table in the meta-data of a database system. Another aspect of the invention is directed to a virtual table that has different column signatures than its underlying source table(s).

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is directed to method and mechanism for "encoding" multiple "virtual" tables into one or more "source" tables, and accessing these virtual tables without requiring separate entries for the virtual tables in the meta-data of a database. No modification to meta-data in a data dictionary is needed to create, modify, or maintain a virtual table. Instead, at run-time, the columns of the virtual table are retrieved and populated using data from existing source tables or other data sources.

A significant aspect of the invention is that the column signature of a virtual table is not dependent upon the format or column signature of the underlying storage vehicles for the data used to populate the virtual table. Instead, the column signature of a virtual table is defined based upon the needs of a user of that table. The underlying data source can be in any format having sufficient storage capacity to hold the data for the virtual table. At run-time, or whenever the virtual table is to be accessed, the data from the underlying data source(s) is accessed using the appropriate format or column signature of the virtual table. The virtual table is therefore insulated from the specific schema characteristics of any underlying data sources. In fact, multiple virtual tables of differing column signatures may be constructed from the same source table.

Figure 1:
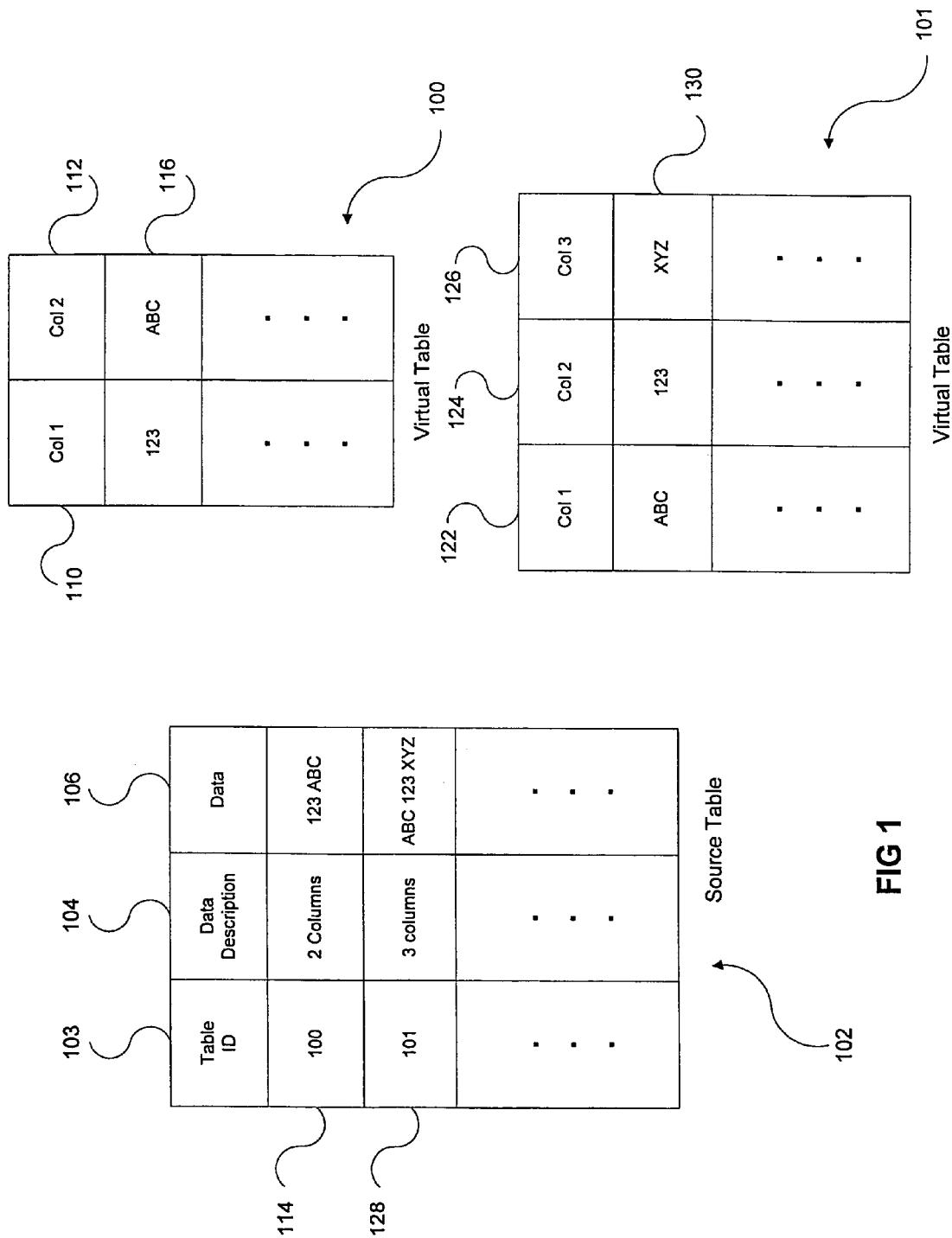
FIG. 1 depicts virtual tables according to an embodiment of the invention.

FIG. 1 illustrates this aspect of the invention. Shown in FIG. 1 is a source database table 102, which is an example of a data source that can be used to populate virtual tables 100 and 101. Source table 102 is a conventional database table that is defined within the schema of the database, and is therefore associated with metadata entries in the system data dictionary. Any changes to the structure of source table 102 requires a change to its corresponding metadata in the data dictionary.

In the example of FIG. 1, each row of source table 102 comprises three columns—a table ID column 103, a data description column 104, and a data column 106. Each row in source table 102 contains a table ID column 103 that identifies the virtual table for which data is stored in that row. Data column 106 contains data for the virtual table identified in the table ID column 103. Data description column 104 contains a description of the schema or format of the data stored in data column 106. It is the data description column 104 that allows a virtual table to be created having any column signature or schema characteristic, but which can be stored in a source table having an entirely different column signature. The contents of the data description column 104 allows the data in data column 106 to be converted into the column signature of its corresponding virtual table.

Virtual table 100 is defined to have two columns, referred to as Col1 110 and Col2 112. Virtual table 100 is not defined in the data dictionary (i.e., no separate meta-data entries exist for virtual table 100) and no additional storage space is allocated for virtual table 100. Instead, although the column signature of virtual table 100 is different from the column signature of source table 102, the data for virtual table 100 is stored in source table 102. Since virtual table 100 is not allocated any storage space in the database system, its rows and columns are logically, and not physically, populated with data from source table 102. Thus, virtual table 100 essentially forms a non-materialized view of selected data from source table 102. At run-time, or whenever rows of data from virtual table 100 are to be accessed, rows corresponding to virtual table 100 are retrieved from source table 102 and are converted into the proper column signature based upon information contained in the data description column 104 for each retrieved row. This converted data is then provided to the entity seeking to access virtual table 100, e.g., a calling SQL statement that queries virtual table 100.

Consider row 114 of source table 102, which corresponds to row 116 of virtual table 100. The table ID column 103 for row 114 contains an identifier that identifies this row as a row of virtual table 100. If a query seeks to access the rows of virtual table 100, row 114 of source table 102 will be retrieved and used to logically populate row 116 of virtual table 100. Data description column 104 of row 114 provides information to view the contents of data column 106 with the proper column format/signature. For example, the data column 106 of row 114 contains the following characters: "123ABC". Data description column 104 of row 114 may indicate that the contents of data column 106 are to be apportioned into two columns of data, in which the first three characters form the first column and the remaining characters form the second column. Thus, characters "123" logically populate column Col1 110 of row 116 in table 100, and characters "ABC" logically populate column Col2 112.

Multiple virtual tables can have their data stored within the same source table 102. For example, consider another virtual table 101 that has three columns—Col1 122, Col2 124, and Col3 126. Row 128 of source table 102 corresponds to row 130 of virtual table 101. The table ID column 103 of row 128 contains an identifier associating this new row with virtual table 101. If a query seeks to access the rows of virtual table 101, row 128 of source table 102 will be retrieved and used to logically populate row 130 of virtual table 101. Data description column 104 of row 128 provides information to view the contents of data column 106 with the proper column format/signature for virtual table 101. For example, the data column 106 of row 128 contains the following characters: "ABC 123XYZ". Data description column 104 of row 128 may indicate that the contents of data column 106 are to be apportioned into three columns of data, in which the first three characters form the first column, the next three characters form the next column, and the remaining characters form the third column. Thus, characters "ABC" logically populate column Col1 122 of row 130 in virtual table 101, characters "123" logically populate column Col2 124, and characters "XYZ" logically populate column Col3 126.

Note that data contained in rows 114 and 128 of table 102 are self-describing, in which the data description column 104 for each row contains information that describes the format and contents of its corresponding data column 106. In an alternative embodiment, a separate structure can be maintained to hold the data description and column information for each row.

Figure 2A:
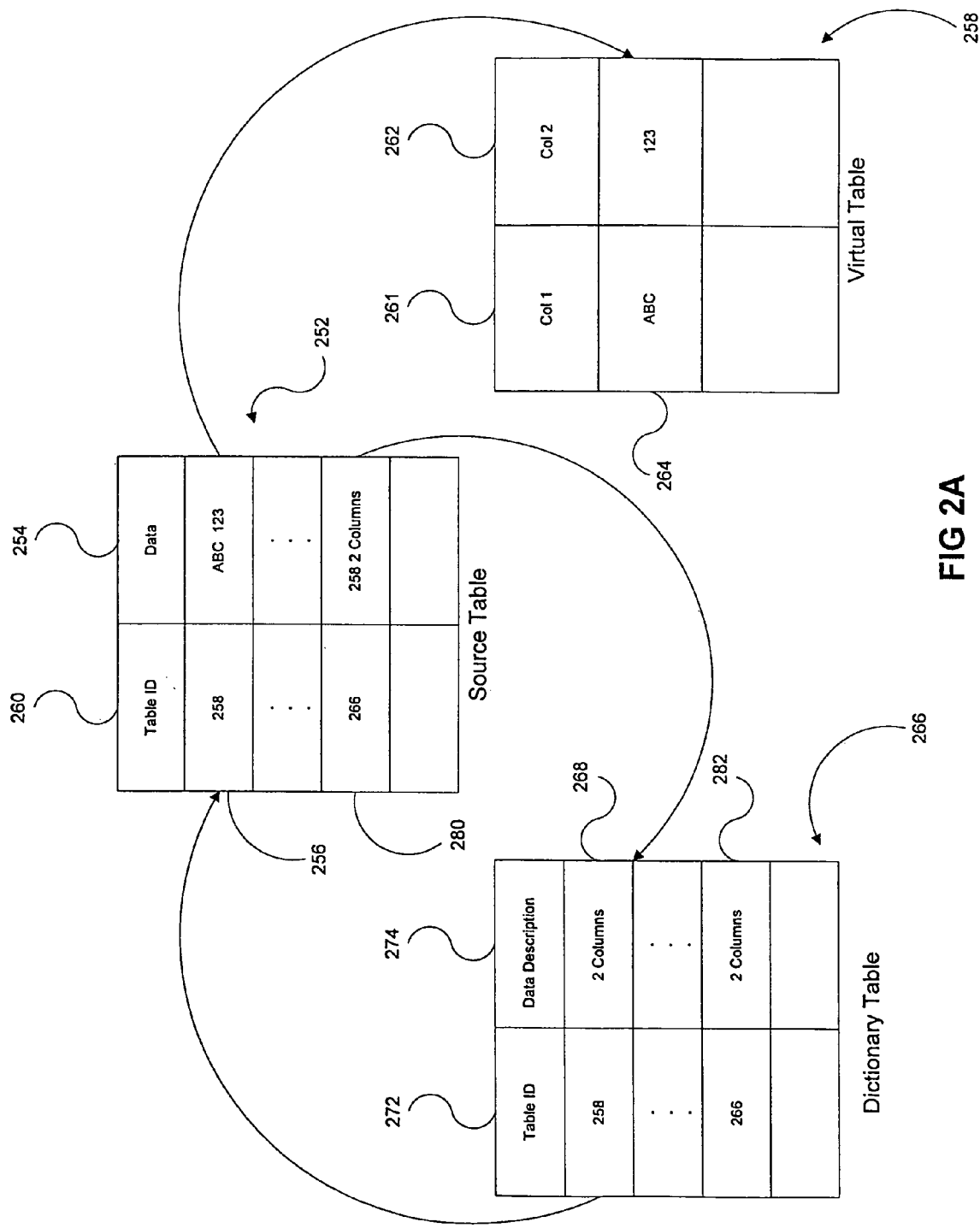
FIG. 2A depicts an approach to representing source data in database tables.

Referring to FIG. 2A, shown is an embodiment of a database table 266, referred to herein as a "dictionary table", that is used to separately store this data description information. Each row of dictionary table 266 comprises two columns—a table ID column 272 and a data description column 274. Table ID column 272 contains an identifier for a virtual table. Data description column 274 provides information to logically format data into the proper column signature of the corresponding virtual table. Each row in source table 252 comprises a table ID column 260 and a data column 254.

Consider if virtual table 258 is populated with data from source table 252. Row 256 contains an identifier for virtual table 258 in its table ID column, therefore this row corresponds to a row in virtual table 258. Row 268 in dictionary table 266 contains column signature information for all rows of virtual table 258, since the table ID column 272 of row 268 contains an identifier to virtual table 258. Thus, the data description column 274 of row 268 is used to logically format the data column 254 of row 256 when populating row 264 of virtual table 258. In this manner, the column signature information for each virtual table can be stored within a single row in dictionary table 266.

Note that dictionary table 266 can itself be a virtual table having its source data stored in source table 252. For example, row 268 in dictionary table 266 corresponds to row 280 in source table 252. This is indicated by the entry in the table ID column 260 of row 280 identifying dictionary table 266. Row 282 in dictionary table 266, which has a table ID entry of "266", is used to logically format the data from row 280 into the appropriate format for dictionary table 266. Thus, the data in data column 254 of row 280 is separated into two columns and used to populate columns 272 and 274 of row 268.

Figure 2B:
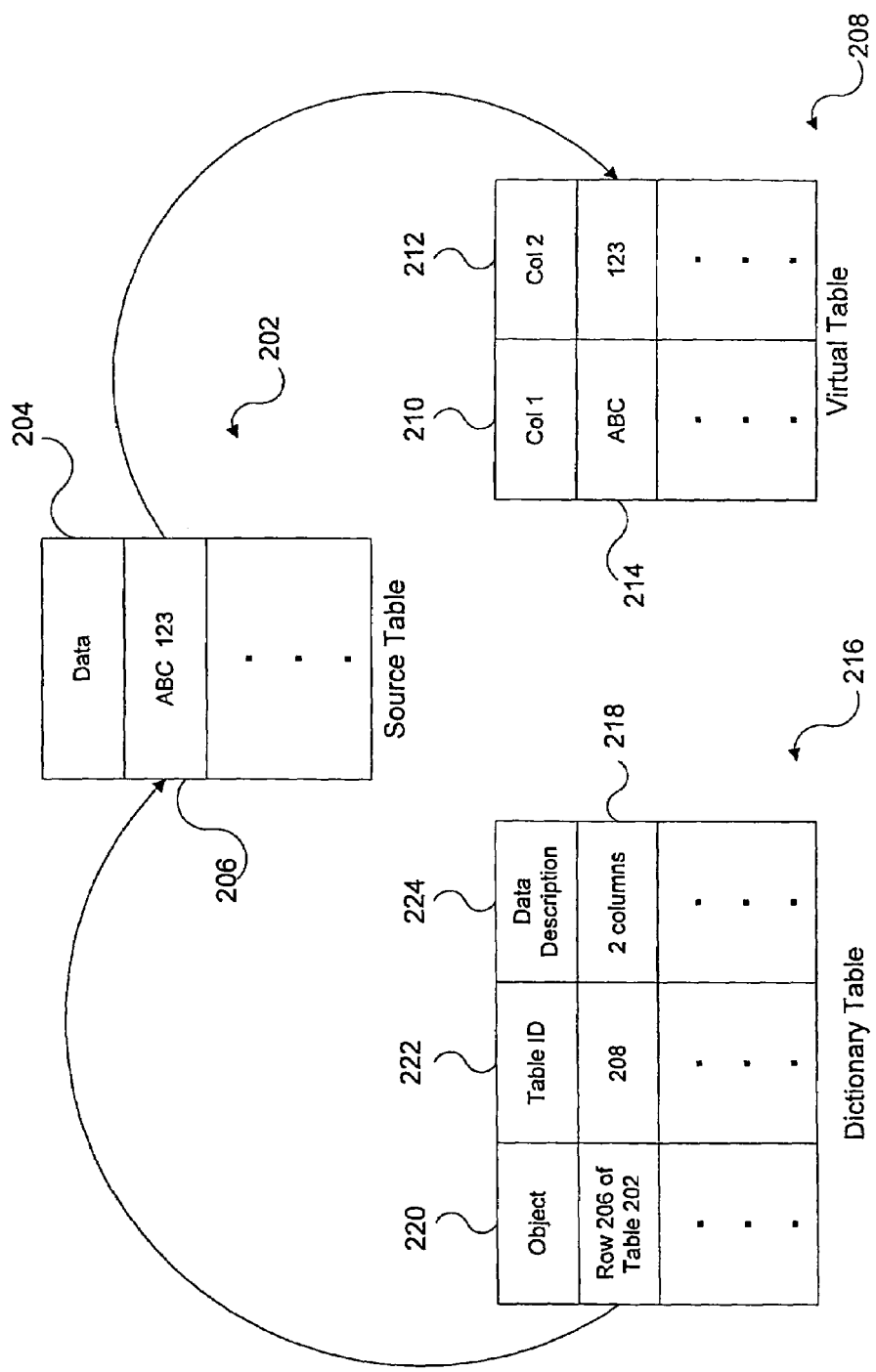
FIG. 2B depicts an alternate approach to representing source data in database tables.

FIG. 2B depicts an alternate approach for storing data description information into a separate dictionary table. In FIG. 2B, dictionary table 216 comprises three columns—an object column 220, a table ID column 222, and a data description column 224. Object column 220 identifies the object which is being described by the row in the dictionary table row. Table ID column 222 contains an identifier for the virtual table that corresponds to the object being described. Data description column 224 provides information to logically format data into the proper column signature of the corresponding virtual column.

In FIG. 2B, each row in source table 202 corresponds to a separate entry in dictionary table 216. This is in contrast to the embodiment of FIG. 2A in which all rows in the source table that correspond to the same virtual table share a single entry in the dictionary table. In the approach of FIG. 2B, source table 202 needs only a single data column 254. No other columns are needed since the description information for each row, including the rows corresponding virtual table, is stored in dictionary table 216.

For example, virtual table 208 comprises columns Col1 210 and Col2 212. Row 218 in dictionary table 216 is the structure containing description information for row 206, since the object column 220 for row 218 contains an identifier pointing to row 206. The contents of row 214 in virtual table 208 is logically populated with data from row 206 of source table 202. Thus, the table ID column 222 of row 218 contains an identifier identifying virtual table 208. If a query seeks to access row 214 of virtual table 208, row 206 of table 202 will be retrieved and used to logically populate row 214. Data description column 224 of row 218 provides information to format the contents of data column 204 of row 206 into the proper column format for virtual table 208. For example, the data column 204 of row 206 contains the following characters: "ABC123". Data description column 224 of row 218 may indicate that the contents of row 206 are to be apportioned into two columns of data, in which the first three characters form the first column, the next three characters form the second column. Thus, characters "ABC" are used to logically populate column Col1 210 of row 214 in virtual table 208, and characters "123" are used to logically populate column Col2 212.

Figure 3:
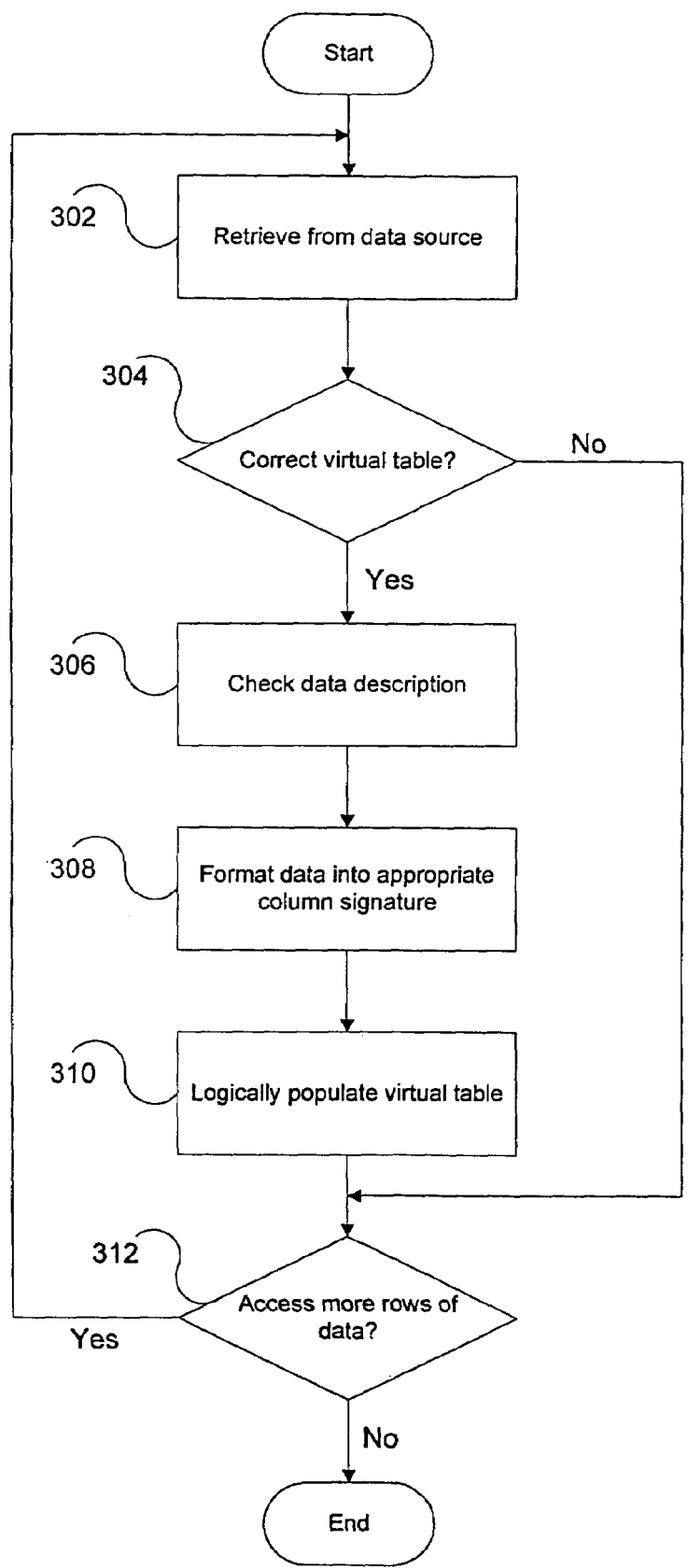
FIG. 3 shows a process flow for accessing a virtual table according to an embodiment of the invention.

According to an embodiment of the invention, user-defined functions are employed to logically populate a virtual table. The user-defined function retrieves data from an underlying data source, and converts the retrieved data into the proper column signature and format based upon description information for the retrieved data. FIG. 3 depicts a process flow that can be used in a user-defined function to access data from the source table 102 depicted in FIG. 1. At process action 302, a row of data is retrieved from a source table 102. A test is performed to determine if the retrieved row corresponds to the relation or virtual table being examined (304). If not, then the process proceeds to process action 312 to determine if more rows of data are to be accessed from source table 102. If the row corresponds to the correct virtual table, then the data description information for that row of data is reviewed (306). Based upon the format and column signature information specified by the data description information, the retrieved data is partitioned into one or more columns of data consistent with the schema of the virtual table (308). The formatted data is then used to logically populate a row of the virtual table (310). A test is performed to determine if more rows of data are to be accessed (312). If necessary, the process returns to process action 302 to retrieve another row of data from source table 102. In essence, the user defied function queries the source table to retrieve rows that corresponds to the virtual table.

The user-defined function can be configured to retrieve data for the virtual table on a column by column basis. Instead of retrieving and returning an entire row for a virtual table, only specific columns are returned from a source table. This is particularly useful when used in conjunction with SQL statements that query for only certain columns of a virtual table. Since individual columns can be retrieved from a source table, columns can be matched with different combinations of other columns to form numerous virtual tables. Thus, a single column can be part of multiple virtual tables.

As an illustrative example of the invention, consider a source table "S_TABLE" having the following column descriptions:

| | | |
|---|---|---|
| TableID | NUMBER | /* Uniquely identifies the real relation */ |
| Data_Description | RAW(2000) | /* Describes column signature for the row */ |
| Data | RAW(2000) | /* Contains column data */ |

A user-defined function GetColVal( ) can be defined to access columns of virtual tables formed from data stored in S_Table. Performing the process described in FIG. 3, GetColVal( ) will retrieve a row of data from S_Table, convert that data into the appropriate column format, and filter the resulting data for the correct column in the virtual table of interest.

An application can query a virtual table "V_Table" using a SQL statement such as the following:

| | |
|---|---|
| SELECT | GetColVal(:Col1, DATA_DESCRIPTION, DATA), |
| | GetColVal(:Col2, DATA_DESCRIPTION, DATA), |
| | GetColVal(:Col3, DATA_DESCRIPTION, DATA), |
| FROM | Source_table |
| WHERE | TableID = V_Table |
| AND | GetColVal(:Col4, DATA_DESCRIPTION, DATA) = :account; |

This query selects rows in virtual table V_Table that contain account information (as indicated by the value of column Col4). The bind variables ":Col1", ":Col2", and ":Col3" represent the particular data values for columns in the virtual table to be retrieved.

The same source table can be used to store data for a second virtual table "V_Table_2". The following represents a database statement that uses the function GetColVal( ) to select rows in virtual table V_Table_2:

| | |
|---|---|
| SELECT | GetColVal(:Col1, DATA_DESCRIPTION, DATA), |
| | GetColVal(:Col2, DATA_DESCRIPTION, DATA), |
| FROM | Source_table |
| WHERE | TableID = V_Table_2 |
| AND | GetColVal(:Col3, DATA_DESCRIPTION, DATA) = 5 |
| AND | GetColVal(:Col5, DATA_DESCRIPTION, DATA) < 10; |

This second query returns the values of ":Col1" and ":Col2" for all rows in virtual table V_Table_2 where the value of column Col3 equals 5 and the value of column Col5 is less than 10. Note that the column signatures of virtual tables V_Table and V_Table_2 are different, even though the data for both virtual tables are stored in the same source table.

In an alternate embodiment, the database system provides specialized data whose dictionary table and data may be different in each user session. A session set up step is performed that loads dictionary table 216 into session memory. The user queries a specialized table defined for this purpose, using the system defined function GetColVal( ). An application query would look like:

```
SELECT     GetColVal ('TableID=208', 'Column=1'),
           GetColVal ('TableID=208', 'Column=2'),
FROM       Source_table
WHERE      TableID=208
AND        GetColVal ('TableID=208', 'Column=2') <456;
```

In this embodiment, preserving data types are important, so the table and column information is provided as literal values to the function. A parser can then access the preloaded dictionary table 216 to determine the data type for each function invocation. Since the dictionary table 216 is pre-loaded and is known to the database system, optimizations such as pruning unwanted data at a very early stage can be made. An example of where this might prove highly desirable would be for mechanisms that mine database log files, such as the mechanism disclosed in copending U.S. application Ser. No. 09/477,023, filed on even day herewith, which is hereby incorporated by reference in its entirety. This type of application could make use of this invention to provide column values extracted from a redo log stream.

Figure 5:
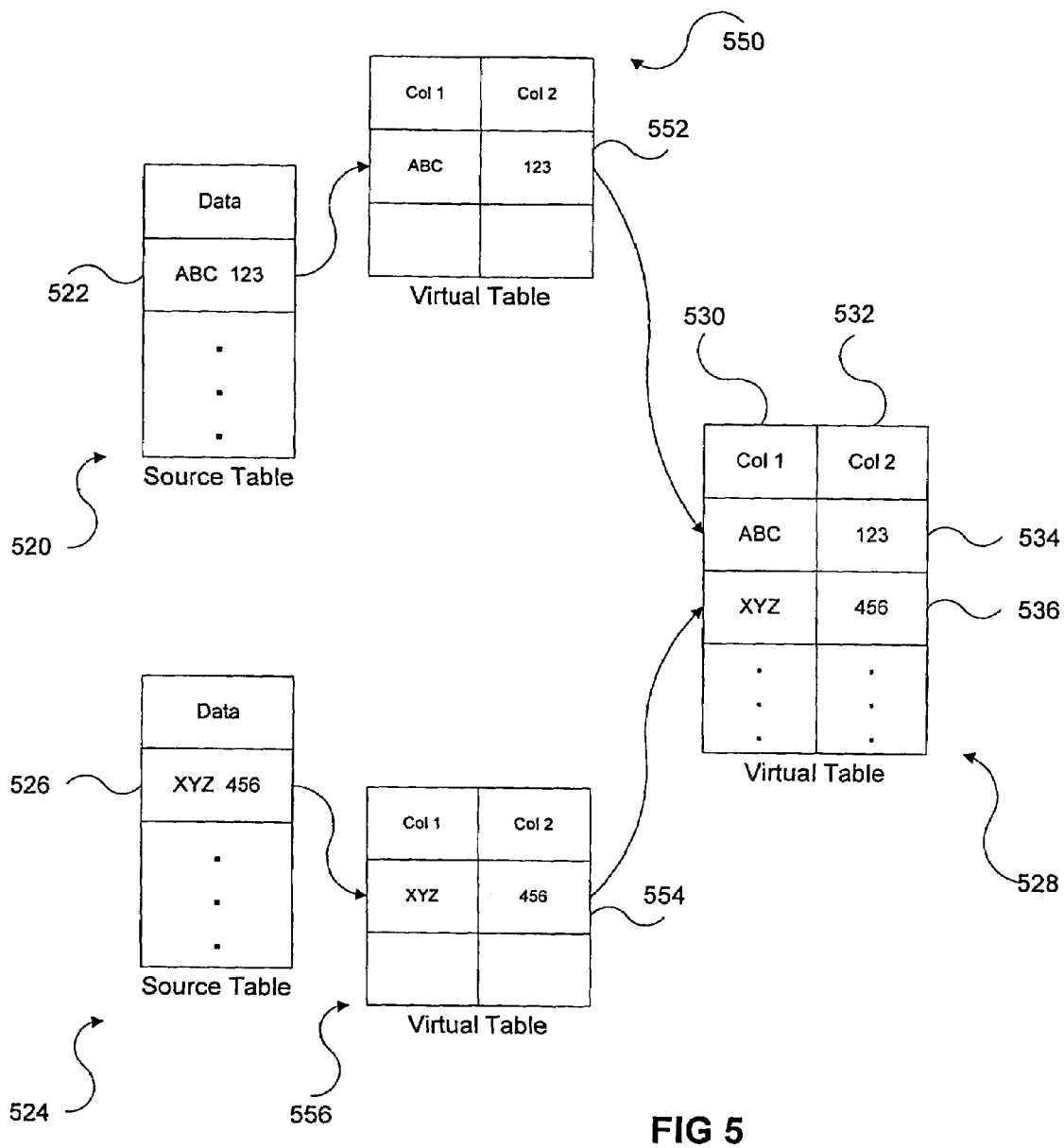
FIG. 5 depicts virtual tables associated with multiple data sources.

Once a virtual table has been constructed, any database query or manipulation operations (such as SQL arithmetic) can be performed against that table, similar to any ordinary database table. As shown in FIG. 5, virtual tables 550 and 556 are populated with data from source tables 520 and 524, respectively. In particular, row 554 of virtual table 556 is populated with data from row 526 in source table 524. Row 552 of virtual table 550 is populated with data from row 522 of source table 520. SQL arithmetic, such as a join operation, can be performed against virtual tables 550 and 556 to form the result set shown in table 528. This example illustrates how a virtual table 528 can be composed of data from multiple source tables 520 and 524. Of course, a user-defined function can also retrieve data from multiple source tables to populate a single virtual table without necessarily requiring the step of forming intermediate virtual tables.

Figure 4:
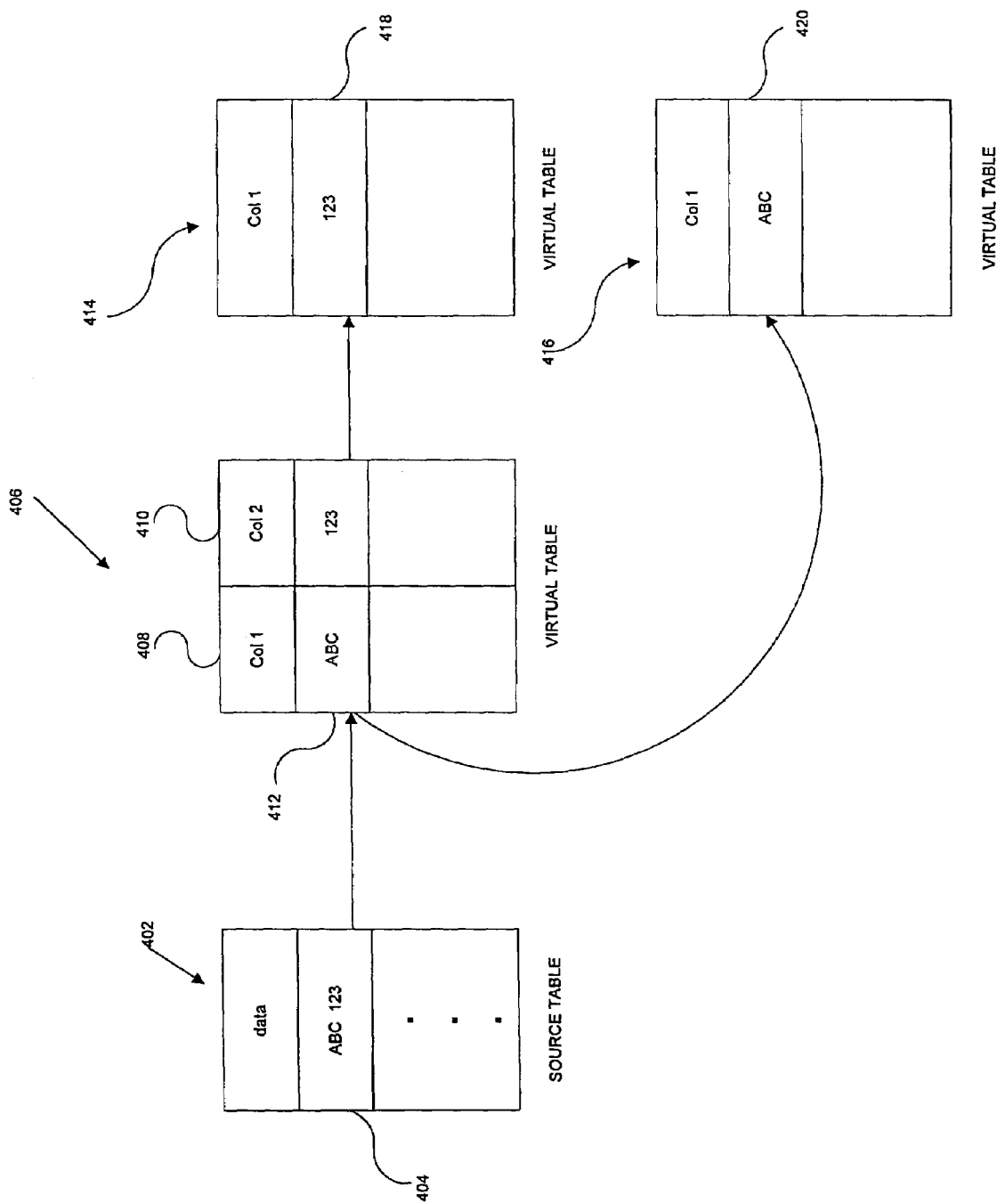
FIG. 4 depicts an architecture for accessing a virtual table.

In a similar manner, a single row in a source table can be used to populate multiple virtual tables. Referring to FIG. 4, shown is a source table 402 having a single data column. Row 404 of source table 402 is used to populate row 412 of virtual table 406. In particular, the "ABC" characters of row 404 populates column 408 of row 412, while the "123" characters of row 404 populated column 410. SQL arithmetic can be performed to retrieve only certain columns from virtual table 406. Thus a first query retrieves column 408 values from virtual table 406 to populate virtual table 416, while a second query retrieves column 410 values to populate virtual table 414.

Many database systems impose a size restriction on individual columns depending upon the column datatype. For instance, the Oracle 8 database system imposes a restriction of 2000 bytes as a maximum size for columns of type RAW and a maximum size of 4000 bytes for columns of type VARCHAR2. Since the present invention encodes rows of the virtual table in source tables, one column in the source table may not be large enough to store the encoded data for a column of a virtual table. To avoid restrictions upon the size of columns in a virtual table, the invention allows for "column coalescing". Column coalescing refers to the use of two or more columns in a source table to store data for a single column in a virtual table. Thus, regardless of column size restrictions, any standard table in the underlying database system can be encoded as a virtual table.

Figure 8:
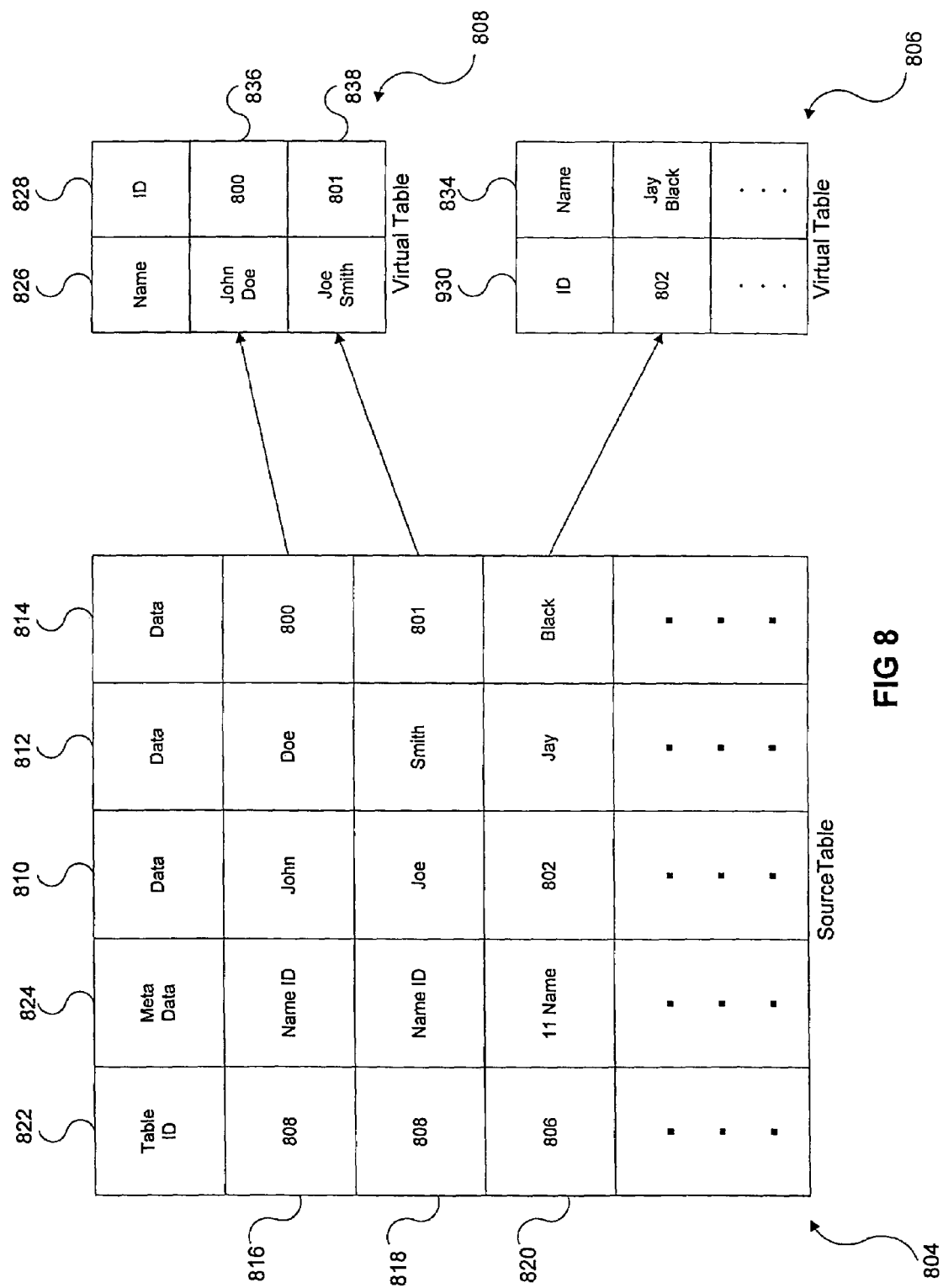
FIG. 8 depicts an example of column coalescing.

Referring to FIG. 8, shown is an example of column coalescing in which encoded data in a row of a virtual table are divided up into multiple columns in the source table. Data in rows 816 and 818 of source table 804 populates rows 836 and 838, respectively, of virtual table 808. In particular, two columns in source table 804 (data columns 810 and 812) are coalesced to form a single column in virtual table 808 (the name column 826). This allows the virtual table 808 to employ columns having widths that are beyond the maximum width of the columns in underlying source tables 804.

Data in row 820 of source table 804 populates a second virtual table 806. Here, data columns 812 and 814 of source table 804 coalesce to form a single column in virtual table 806 (i.e. the name column 834). The metadata column 824 contains information that allows the user-defined function to automatically produce the proper coalesced column from two or more data columns in the source table 804.

"Row Coalescing" can also be implemented with the present invention, in which data from multiple rows in a source table are coalesced into a smaller number of rows in a virtual table. This technique is useful if the amount of data in a single row of a virtual table exceeds the maximum allowable size of a row in the source table. This may occur since the source table is stored in the native format of the underlying database system, and the extra information, e.g., table definition etc., for a virtual table stored in the source table imposes additional storage burdens to the source table. For example, if an underlying database allows each table to have a maximum of 100 columns, and 3 columns are needed to store meta-data information for a virtual table, this necessarily means that only a maximum of 97 columns are available per row to store data for the virtual table. Due to the size of columns in the virtual table, the encoded data of a virtual table may not fit in a single row of the source table.

An embodiment of the invention addresses this problem by adding two more additional columns of meta-data to the source table (referred to herein as SPILL_POSITION and HEAD_ROWID). The SPILL_POSITION identifies whether a row in the source table is part of a coalesced row in the virtual table, and further identifies the position of that row in the coalesced virtual row. For rows that are to be coalesced, the HEAD_ROWID identifies the row in the source table that is the first portion of the coalesced row. The following example illustrates this aspect of the invention:

For rows of virtual table that fits in a single row of the source table, the SPILL_POSITION is 0 and HEAD_ROWID is rowid of the original row.

For rows that spill over to other rows (e.g., spilled to 4 rows),

Row-1 SPILL_POSITION=1 (this is the first portion of the spilled row), HEAD_ROWID=RowId of Row 1

Row-2 SPILL_POSITION=2 (this is the second portion of the spilled row), HEAD_ROWID=RowId of Row 1

Row-3 SPILL_POSITION=3 (this is the third portion of the spilled row), HEAD_ROWID=RowId of Row 1

Row-4 SPILL_POSITION=4 (this is the fourth portion of the spilled row), HEAD_ROWID=RowId of row 1.

The following simple SQL query can then group all spilled portions of the rows together:
Select *
FROM Source_Table
group by HEAD_ROWID
order by SPILL_POSITION Internally the GetColVal( ) function executes the SQL statement to group the rows together and decode them to provide the necessary column information for the virtual table.

Figure 9:
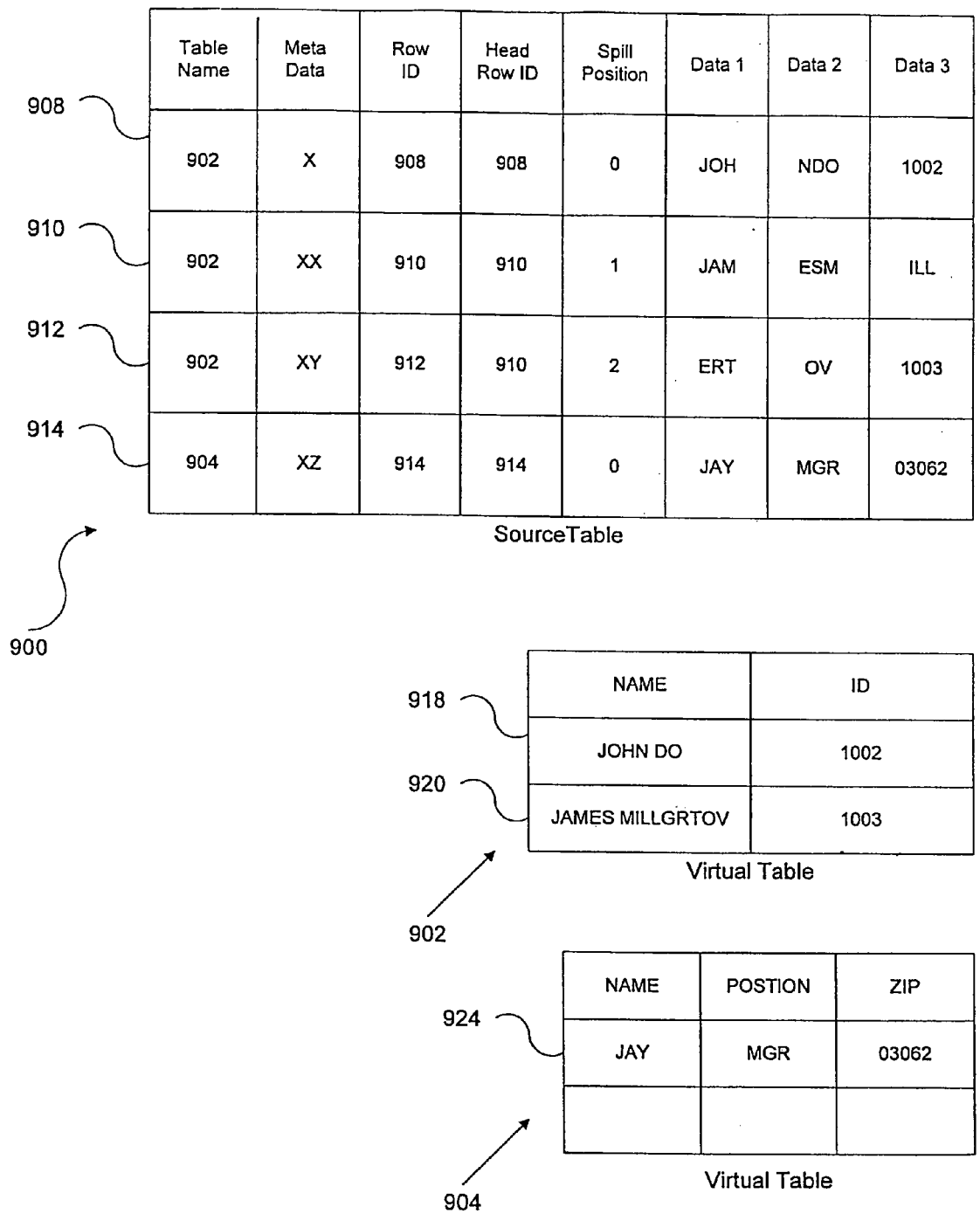
FIG. 9 depicts an example of row coalescing.

FIG. 9 illustrates an example of row coalescing in an embodiment of the invention. Row 918 in virtual table 902 corresponds to a single row 908 in source table 900. In other words, the amount of data in row 918 of virtual table 902 fits entirely within the available storage space in row 908 of source table 900. Therefore, SPILL_POSITION=0 for row 908, and HEAD_POSITION=rowid.

Note that row 920 in virtual table 902 is coalesced from multiple rows in the source table 900 (i.e., rows 910 and 912). This occurs because the data in 910 "spills over" into row 912 (i.e., the amount of available storage space in row 910 of source table 900 is not enough to store the entire contents of the data in row 918 of virtual table 902). Since row 910 is in the first position of the coalesced rows, SPILL_POSITION for row 910 is "1", and HEAD_ROWID is equal to row 910's rowid. Since row 912 is in the second position of the coalesced row, SPILL_POSITION for row 912 is "2", and HEAD_ROWID is equal to the rowid for the row in the first position (i.e., roid=910). When row 920 of virtual table 902 is accessed, both row 910 and now 912 are utilized to populate the data columns of this virtual row.

Row 924 in virtual table 904 corresponds to a single row 914 in source table 900. Thus, the SPILL_POSITION value for row 914 is "0", and the HEAD_ROWID value is equal to the rowid for row 914.

Figure 10:
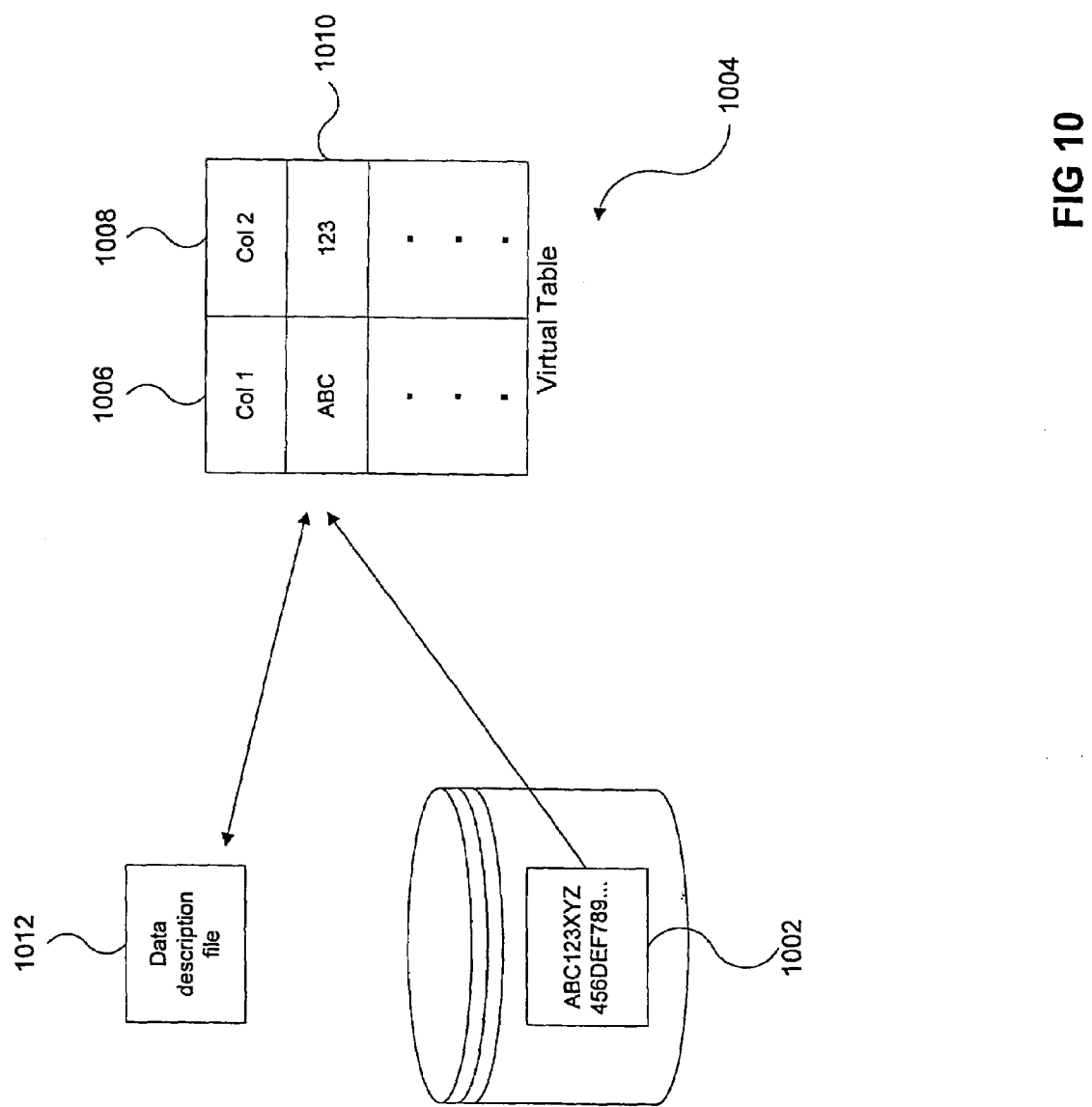
FIG. 10 depicts an operating system file being used as a data source for a virtual table.

The invention has been specifically described with respect to database tables as the data source for virtual tables. However, any data source can be used to provide data to populate a virtual table within the scope of the invention, whether or not the data source is a database table or database structure. As an example, shown in FIG. 10 is a flat operating system file 1002 containing a set of data. Operating system file 1002 contains a streamed set of data records in a non-relational format. A data description file 1012 is used to convert the data records in file 1002 into the appropriate column format. Using the general process described in FIG. 3, each data record is retrieved from file 1002, and using data description information from data description file 1012, is converted in the appropriate column format of virtual table 1004.

System Architecture Overview

Figure 6:
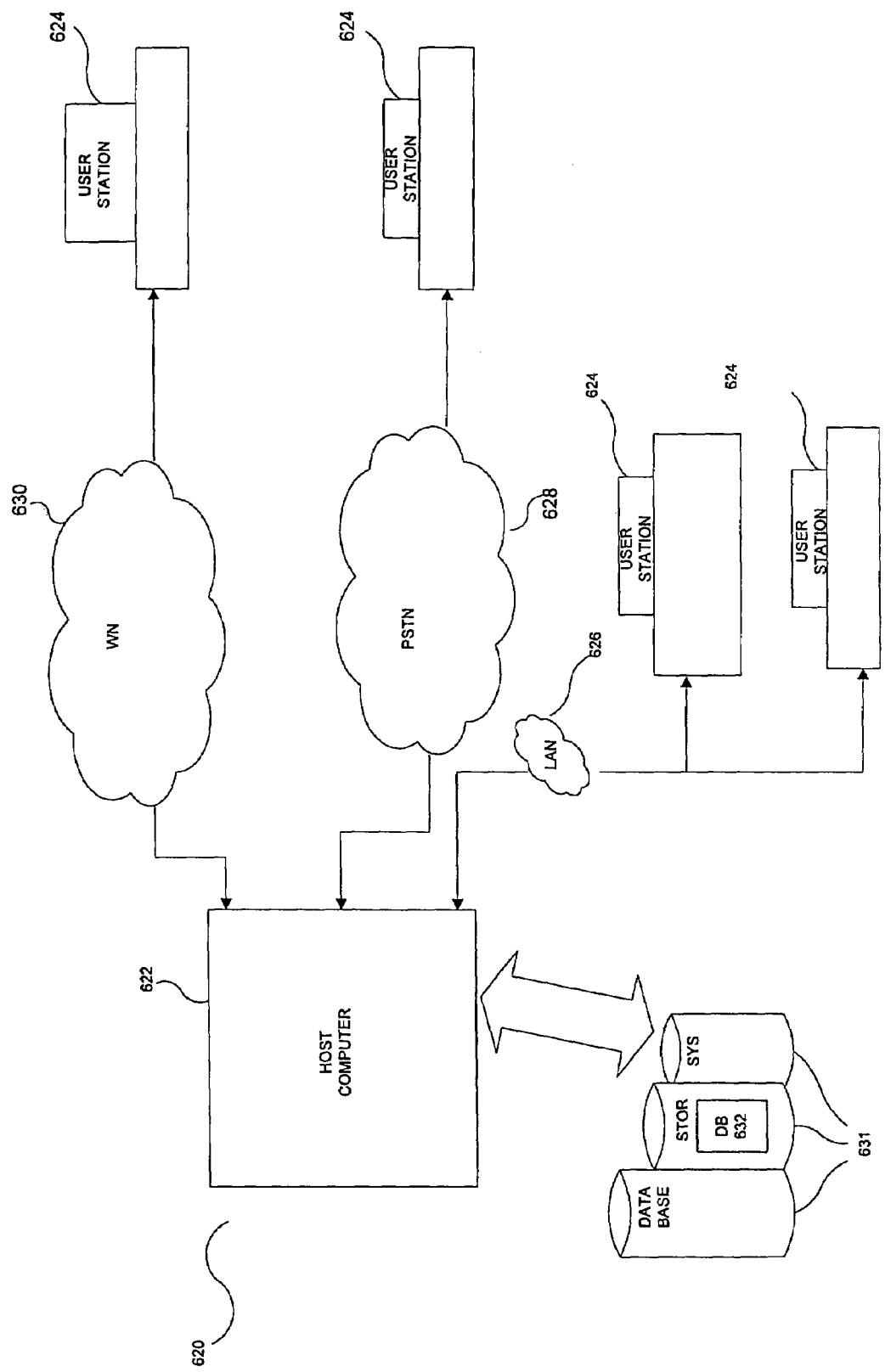
FIG. 6 is a diagram of a computer hardware system with which the present invention can be implemented.

Referring to FIG. 6, in an embodiment, a computer system 620 includes a host computer 622 connected to a plurality of individual user stations 624. In an embodiment, the user stations 624 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 624 are connected to the host computer 622 via a local area network ("LAN") 626. Other user stations 624 are remotely connected to the host computer 622 via a public telephone switched network ("PSTN") 628 and/or a wireless network 630.

In an embodiment, the host computer 622 operates in conjunction with a data storage system 631, wherein the data storage system 631 contains a database 632 that is readily accessible by the host computer 622.

In alternative embodiments, the database 632 may be resident on the host computer, stored, e.g., in the host computer's ROM, PROM, EPROM, or any other memory chip, and/or its hard disk. In yet alternative embodiments, the database 632 may be read by the host computer 622 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 622 can access two or more databases 632, stored in a variety of mediums, as previously discussed.

Figure 7:
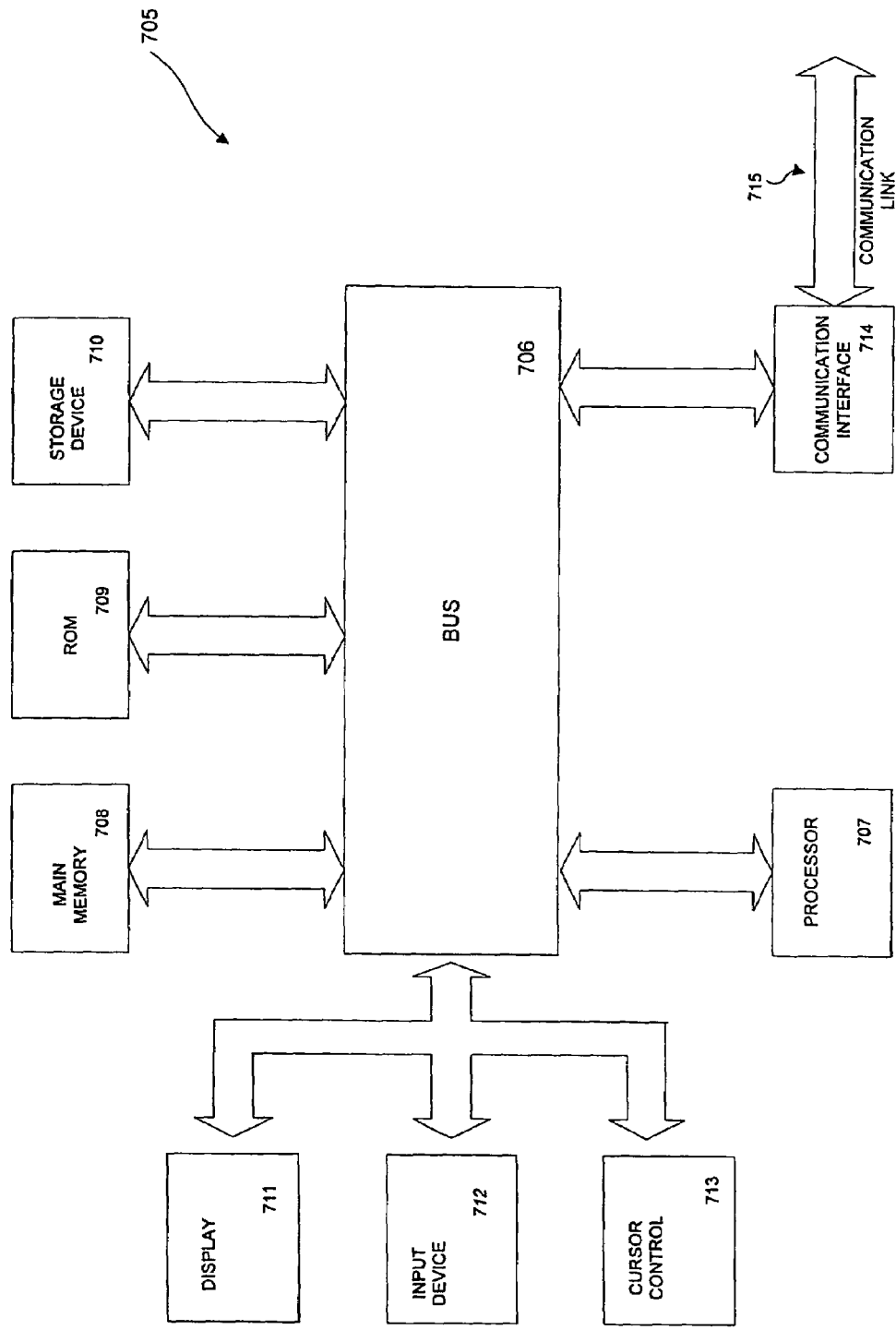
FIG. 7 is an additional diagram of computer hardware system with which the present invention can be implemented.

Referring to FIG. 7, in an embodiment, each user station 624 and the host computer 622, each referred to generally as a processing unit, embodies a general architecture 705. A processing unit includes a bus 706 or other communication mechanism for communicating instructions, messages and data, collectively, information, and one or more processors 707 coupled with the bus 706 for processing information. A processing unit also includes a main memory 708, such as a random access memory (RAM) or other dynamic storage device, coupled to the bus 706 for storing dynamic data and instructions to be executed by the processor(s) 707. The main memory 708 also may be used for storing temporary data, i.e., variables, or other intermediate information during execution of instructions by the processor(s) 707.

A processing unit may further include a read only memory (ROM) 709 or other static storage device coupled to the bus 706 for storing static data and instructions for the processor(s) 707. A storage device 710, such as a magnetic disk or optical disk, may also be provided and coupled to the bus 706 for storing data and instructions for the processor(s) 707.

A processing unit may be coupled via the bus 706 to a display device 711, such as, but not limited to, a cathode ray tube (CRT), for displaying information to a user. An input device 712, including alphanumeric and other keys, is coupled to the bus 706 for communicating information and command selections to the processor(s) 707. Another type of user input device may include a cursor control 713, such as, but not limited to, a mouse, a trackball, a fingerpad, or cursor direction keys, for communicating direction information and command selections to the processor(s) 707 and for controlling cursor movement on the display 711.

According to one embodiment of the invention, the individual processing units perform specific operations by their respective processor(s) 707 executing one or more sequences of one or more instructions contained in the main memory 708. Such instructions may be read into the main memory 708 from another computer-usable medium, such as the ROM 709 or the storage device 710. Execution of the sequences of instructions contained in the main memory 708 causes the processor(s) 707 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 707. Such a medium may take many forms, including, but not limited to, non-volatile, volatile and transmission media. Non-volatile media, i.e., media that can retain information in the absence of power, includes the ROM 709. Volatile media, i.e., media that can not retain information in the absence of power, includes the main memory 708. Transmission media includes coaxial cables, copper wire and fiber optics, including the wires that comprise the bus 706. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 707 can retrieve information.

Various forms of computer-usable media may be involved in providing one or more sequences of one or more instructions to the processor(s) 707 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 706 may receive the infrared signals and place the instructions therein on the bus 706. The bus 706 may carry the instructions to the main memory 708, from which the processor(s) 707 thereafter retrieves and executes the instructions. The instructions received by the main memory 708 may optionally be stored on the storage device 710, either before or after their execution by the processor(s) 707.

Each processing unit may also include a communication interface 714 coupled to the bus 706. The communication interface 714 provides two-way communication between the respective user stations 624 and the host computer 622. The communication interface 714 of a respective processing unit transmits and receives electrical, electromagnetic or optical signals that include data streams representing various types of information, including instructions, messages and data.

A communication link 715 links a respective user station 624 and a host computer 622. The communication link 715 may be a LAN 626, in which case the communication interface 714 may be a LAN card. Alternatively, the communication link 715 may be a PSTN 628, in which case the communication interface 714 may be an integrated services digital network (ISDN) card or a modem. Also, as a further alternative, the communication link 715 may be a wireless network 630.

A processing unit may transmit and receive messages, data, and instructions, including program, i.e., application, code, through its respective communication link 715 and communication interface 714. Received program code may be executed by the respective processor(s) 707 as it is received, and/or stored in the storage device 710, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A computer implemented process for accessing a virtual table comprising:
   identifying a first data source;
   associating a first record within said first data source to a virtual table;
   accessing said first record;
   identifying a second data source;
   associating a second record within said second data source to said virtual table;
   accessing said second record; and
   logically populating said virtual table with said first record and said second record, said first record populates a row in said virtual table, said second record also populate said row.

2. A computer implemented process for accessing a virtual table comprising:
   identifying a data source;
   associating a record within said data source to a virtual table, said record comprises a first column and a second column;
   accessing said record; and
   logically populating said virtual table with said record, both said first column and said second column of said record are used to populate a single column in said virtual table.

3. A computer implemented process for accessing a virtual table comprising:
   identifying a first data source;
   associating a first record within said first data source to a first virtual table;
   accessing said first record;
   logically populating said first virtual table with said first record;
   identifying a second data source;
   associating a second record within said second data source to a second virtual table;
   accessing said second record;
   logically populating said second virtual table with said second record; and
   performing a data manipulation operation against both said first virtual table and said second virtual table.

4. The process of claim 3 in which said data manipulation operation comprises a database join operation.

5. A computer program product that includes a tangible storage medium usable by a processor, the medium having stored thereon a sequence of instructions which, when executed by said processor, causes said processor to execute a process for accessing a virtual table, said process comprising:
   identifying a first data source;
   associating a first record within said first data source to a virtual table;
   accessing said first record;

identifying a second data source;
associating a second record within said second data source to said virtual table;
accessing said second record; and
logically populating said virtual table with said first record and said second record, said first record populates a row in said virtual table, said second record also populates said row.

6. A computer program product that includes a tangible storage medium usable by a processor, the medium having stored thereon a sequence of instructions which, when executed by said processor, causes said processor to execute a process for accessing a virtual table, said process comprising:
identifying a data source;
associating a record within said data source to a virtual table, said record comprises a first column and a second column;
accessing said record; and
logically populating said virtual table with said record, both said first column and said second column of said record are used to populate a single column in said virtual table.

7. A computer program product that includes a tangible storage medium usable by a processor, the medium having stored thereon a sequence of instructions which, when executed by said processor, causes said processor to execute a process for accessing a virtual table, said process comprising:
identifying a first data source;
associating a first record within said first data source to a first virtual table;
accessing said first record;
logically populating said first virtual table with said first record;
identifying a second data source;
associating a second record within said second data source to a second virtual table;
accessing said second record;
logically populating said second virtual table with said second record; and
performing a data manipulation operation against both said first virtual table and said second virtual table.

8. A computer implemented system for accessing a virtual table comprising:
means for identifying a first data source;
means for associating a first record within said first data source to a virtual table;
means for accessing said first record;
means for identifying a second data source;
means for associating a second record within said second data source to said virtual table;
means for accessing said second record; and
means for logically populating said virtual table with said first record and said second record, said first record populates a row in said virtual table, said second record also populates said row.

9. A computer system for accessing a virtual table comprising:
means for identifying a data source;
means for associating a record within said data source to a virtual table, said record comprises a first column and a second column;
means for accessing said record; and
means for logically populating said virtual table with said record, both said first column and said second column of said record are used to populate a single column in said virtual table.

10. A computer implemented system for accessing a virtual table comprising:
means for identifying a first data source;
means for associating a first record within said first data source to a first virtual table;
means for accessing said first record;
means for logically populating said first virtual table with said first record;
means for identifying a second data source;
means for associating a second record within said second data source to a second virtual table;
means for accessing said second record;
means for logically populating said second virtual table with said second record; and
means for performing a data manipulation operation against both said first virtual table and said second virtual table.

11. A computer implemented method for accessing a virtual table comprising:
identifying a data source;
associating a record within said data source to a viral table, wherein said virtual table is not defined with database metadata;
accessing said record; and
logically populating said virtual table with said record.

12. The method of claim 11 in which said record is accessed based upon data description information for said record.

13. The method of claim 11 in which a user-defined function is used to access said virtual table.

14. The method of claim 11 further comprising:
identifying a second data source;
associating a second record within said second data source to said virtual table;
accessing said second record; and
logically populating said virtual table with said second record.

15. The method of claim 14 in which said record populates a row in said virtual table, said second record also populates said row.

16. The method of claim 11 in which said record comprises a first and a second column, both said first and said second columns are used to populate a single column in said virtual table.

17. The method of claim 11 in which a data manipulation operation is performed against said virtual table.

18. The method of claim 17 further comprising:
identifying a second data source;
associating a second record within said second data source to a second virtual table;
accessing said second record; and
logically populating said second virtual table with said second record, wherein said data manipulation operation operates against both said virtual table and said second virtual table.

19. A computer program product that includes a tangible storage medium usable by a processor, the medium having stored thereon a sequence of instructions which, when executed by said processor, causes said processor to execute a method for accessing a virtual table, said method comprising:

identifying a data source;

associating a record within said data source to a virtual table, wherein said viral table is not defined with database metadata;

accessing said record; and logically populating said virtual table with said record.

20. The computer program product of claim 19 in which said record is accessed based upon data description information for said record.

21. The computer program product of claim 19 in which a user-defined function is used to access said virtual table.

22. The computer program product of claim 19 further comprising:

identifying a second data source;

associating a second record within said second data source to said virtual table;

accessing said second record; and logically populating said virtual table with said second record.

23. The computer program product of claim 22 in which said record populates a row said virtual table, said second record also populates said row.

24. The computer program product of claim 19 in which said record comprises a first and a second column, both said first and said second columns are used to populate a single column in said virtual table.

25. The computer program product of claim 19 in which a data manipulation operation is performed against said virtual table.

26. The computer program product of claim 25 further comprising:

identifying a second data source;

associating a second record within said second data source to a second virtual table;

accessing said second record; and logically populating said second virtual table with said second record, where said data manipulation operation operates against both said virtual table and said second virtual table.

27. A computer implemented system for accessing a virtual table comprising:

means for identifying a data source;

means for associating a record within said data source to a virtual table, wherein said virtual table is not defined with database metadata;

means for accessing said record; and means for logically populating said virtual table with said record.

28. The system of claim 27 in which said record is accessed based upon data description information for said record.

29. The system of claim 27 in which a user-defined function is used to access said virtual table.

30. The system of claim 27 further comprising:

means for identifying a second data source;

means for associating a second record within said second data source to said virtual table;

means for accessing said second record; and means for logically populating said virtual table with said second record.

31. The system of claim 30 in which said record populates a row in said virtual table, said second record also populates said row.

32. The system of claim 27 in which said record comprises a first and a second column, both said first and said second columns are used to populate a single column in said virtual table.

33. The system of claim 27 in which a data manipulation operation is performed against said virtual table.

34. The system of claim 33 further comprising:

means for identifying a second data source;

means for associating a second record with said second data source to a second virtual table;

means for accessing said second record; and means for logically populating said second virtual table with said second record, wherein said data manipulation operation operates against both said virtual table and said second virtual table.

* * * * *